Oct. 19, 1926.
G. A. HILL
1,603,694
FOOD CONTAINER
Filed Feb. 13, 1925
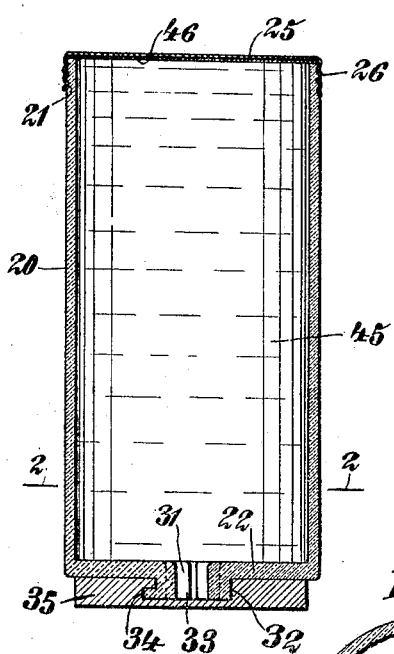
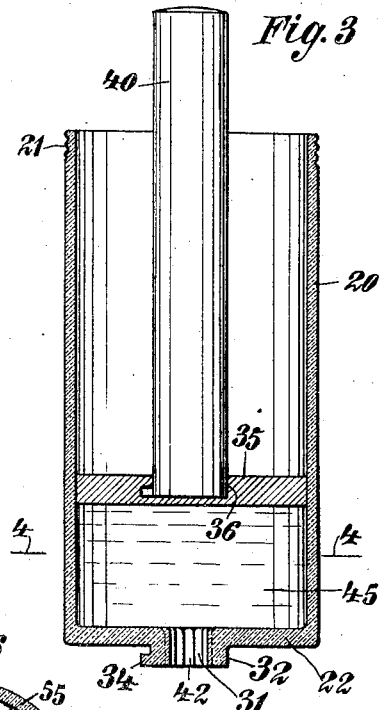
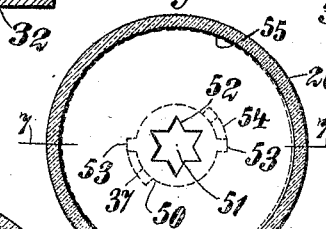
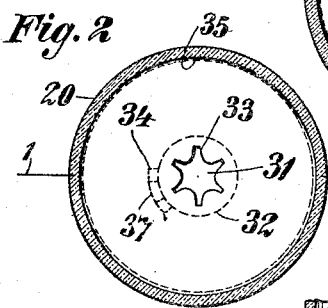
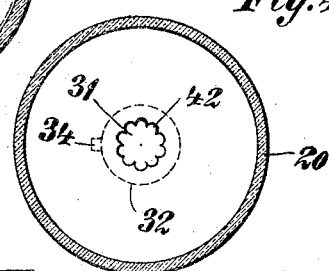
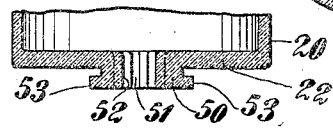
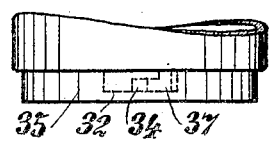
INVENTOR
George A. Hill.
BY
ATTORNEY Patented Oct. 19, 1926.

1,603,694

UNITED STATES PATENT OFFICE.

GEORGE A. HILL, OF NEW YORK, N. Y.

FOOD CONTAINER.

Application filed February 13, 1925. Serial No. 9,016.

The invention relates to a food container.

The invention is particularly directed to a container for foods in plastic form, which are to be ejected in a stream of various forms, and used to ornament the surfaces of cakes and the like. The plastic foods are sometimes made of a mixture of flour, eggs, cream, sugar and the like, to which a coloring agent may be added.

The object of the invention is the production of a container, in which the food or other plastic substance is securely preserved from the atmosphere when not ejected from the container, and from which the food or other plastic substance can be easily discharged.

The organization of the invention comprises a cup shaped barrel with a cap detachably connected to its top or inlet end, and a discharge nozzle at its bottom end. A piston is adapted to slide in the barrel to discharge the contents thereof, and is provided with a piston rod. The piston is locked to the bottom end of the barrel when not used to discharge the contents thereof and seals the opening through the discharge nozzle, and constitutes a cover for the bottom end of the barrel of the container. The cross section of the opening through the discharge nozzle can be made of various forms, to discharge streams of different cross sections from the container.

In the accompanying drawings Fig. 1 represents a vertical section, as on the line I, I of Fig. 2, of an exemplification of the improved container; Fig. 2 shows a section of Fig. 1 on the line 2; Fig. 3 indicates a section similar to Fig. 1 with an element in a different position and a slight modification; Fig. 4 shows a section of Fig. 3 on the line 4, 4; Fig. 5 represents a fragmentary outside elevation of a portion of the lower end of the container; Fig. 6 shows a section similar to Fig. 4 with a modification and Fig. 7 indicates a section of Fig. 6 on the line 7, 7.

The container comprises a barrel with the wall 20 preferably of glass, open at its top end with the exterior thread 21. The bottom wall of the container is shown at 22 integral with the wall 20. A detachable top cap 25, preferably of metal, has formed therewith the threaded flange 26, which engages the exterior thread 21 when the container has been charged with its contents.

A discharge nozzle 32 extends from the bottom face of the wall 22. A corrugated discharge opening 31 with the discharge grooves 33 is formed in the nozzle 32.

The bayonet pin 34 extends from the outer wall of the nozzle 32. A piston 35 is adapted to slide in the barrel 20, and has formed therein the cavity with the cylindrical wall 36, and the bayonet groove 37.

A piston rod 40 is adapted to engage the cavity in the piston 35, when said piston discharges the contents of the barrel having the wall 20. The barrel with the wall 20 is indicated with the plastic food 45 or other plastic substances, which has preferably located on its top thereof a cover 46 of waxed paper and the like.

In Fig. 1 the container is shown charged with the plastic food 45, and the piston 35 with the bayonet groove 37 is locked to the pin 34 of the nozzle 32, and functions as a cover for the bottom wall 22 of the barrel with the wall 20.

When the contents of the container is to be discharged therefrom, the top cap 25 is removed from the wall 20, and the cover 46 is lifted from the contents 45 of the barrel. Next the piston 35 is disengaged from the nozzle 32, and one end of the piston rod 40 is seated in the cavity of the piston 35. The piston is then brought to bear on the top face of the contents of the barrel, and by means of the piston rod 40 the said piston is pushed down the barrel, which will cause the plastic food 45 or other substance to be discharged through the opening in the discharge nozzle 32.

Referring to Fig. 4 the opening 31 of the discharge nozzle has formed therewith the modified grooves 42 similar in shape to a rosette.

In Figs. 6 and 7 the lower portion of the barrel is again indicated with the wall 20 and the bottom wall 22. A nozzle 50 extends from the wall 22 and has formed therewith a discharge opening 51 which has a star shaped perimeter 52. A pair of bayonet locking pins 53 extend from the nozzle to lock with corresponding bayonet grooves 37 and 54 in the piston 55 similar to 37.

When the container is shipped for use the piston 35 is locked to the discharge nozzle as indicated in Figs. 1, 2 and 5 and the piston rod 40 is located adjacent to the barrel having the wall 20 and connected thereto by a piece of twine and the like.

When the container has been emptied of its charge, it may be thrown away, or it may be again used. When the container has been emptied the piston 35 may be easily discharged therefrom by inserting a rod through the opening 31 of the discharge nozzle 32, and bearing one end of the rod on the piston, which it will easily slide and be discharged from the container.

Various modifications may be made in the invention and the present exemplification is to be taken as illustrative and not limitative thereof.

Having described my invention what I desire to secure by Letters Patent and claim is:

1. In a container for a plastic substance the combination of a barrel, a discharge nozzle for the lower end of the barrel, a piston adapted to slide in the barrel, a piston rod adapted to bear against said piston, and means to detachably lock said piston to said discharge nozzle to close the opening therethrough.

2. In a container for plastic substances the combination of a barrel with a bottom wall, a cap detachably connnected to the top end of the barrel, a discharge nozzle extending from the bottom wall of the barrel, said nozzle having an opening with corrugations in its wall constituting discharge grooves, a pin extending from the discharge nozzle, a piston adapted to slide in the barrel, said piston having a cavity with a bayonet groove, a piston rod adapted to be seated in the cavity of the piston, said piston also adapted to be locked to the discharge nozzle of the barrel by locking its bayonet groove with the pin extending from said nozzle.

3. In a container for plastic substances the combination of a barrel, a bottom wall for the barrel, a discharge nozzle for said bottom wall, a pin extending from the discharge nozzle, a piston adapted to slide in the barrel, said piston having a cavity with a cylindrical wall, said wall having a bayonet groove formed therein, a piston rod adapted to be seated in the cavity of the piston, said piston adapted to be locked to the discharge nozzle by locking its bayonet groove with the pin extending from said discharge nozzle.

4. In a container for plastic substances the combination of a barrel, a bottom wall for the barrel, a discharge nozzle for said bottom wall, a pair of pins extending from the discharge nozzle, a piston adapted to slide in the barrel, said piston having a cavity, said cavity having a pair of bayonet grooves formed in its wall and a piston rod adapted to be seated in said cavity, said piston adapted to be locked to the discharge nozzle by locking its bayonet grooves with the pins extending from said discharge nozzle.

Signed at the borough of Manhattan, city of New York, in the county of New York and State of New York this 8th day of January A. D. 1925.

GEORGE A. HILL.